US011244237B2

(12) United States Patent
Zhang et al.

(10) Patent No.: US 11,244,237 B2
(45) Date of Patent: Feb. 8, 2022

(54) DETERMINING DEPLOYMENT NEED FOR POINT OF INTEREST (71) Applicant: Advanced New Technologies Co., Ltd., George Town (KY)

(72) Inventors: Hanrui Zhang, Hangzhou (CN); Mingxu Shao, Hangzhou (CN); Shaoli Qian, Hangzhou (CN); Haoyuan Pan, Hangzhou (CN); Haijun Xu, Hangzhou (CN); Di Xu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 957 days.

(21) Appl. No.: 15/909,640

(22) Filed: Mar. 1, 2018

(65) Prior Publication Data

US 2018/0189665 A1 Jul. 5, 2018

Related U.S. Application Data (63) Continuation of application No. PCT/CN2016/096788, filed on Aug. 25, 2016.

(30) Foreign Application Priority Data

Sep. 2, 2015 (CN) .......................... 201510558108.7

(51) Int. Cl.
*G06F 9/44* (2018.01)
*G06N 7/00* (2006.01)
(Continued)

(52) U.S. Cl.
CPC ............... *G06N 7/00* (2013.01); *G06F 16/29* (2019.01); *G06F 16/951* (2019.01);
(Continued)

(58) Field of Classification Search
CPC ...... G06F 3/0482; G06F 16/29; G06F 16/951; G06F 16/9537; G06Q 10/0637;
(Continued)

(56) References Cited

U.S. PATENT DOCUMENTS 8,199,126 B1 * 6/2012 Taubman ............ G06F 3/04883
345/173
2009/0005021 A1 1/2009 Forstall et al.
(Continued)

FOREIGN PATENT DOCUMENTS

| CN | 102054354 | 5/2011 |
| CN | 102609783 | 7/2012 |

(Continued)

OTHER PUBLICATIONS

Gennaro et al., "Customer-Driven Design of the Recharge Infrastructure and Vehicle-to-Grid in Urban Areas: A Large-Scale Application for Electric Vehicles Deployment," Science Direct, Feb. 14, 2015, 18 pages.
(Continued)

*Primary Examiner* — Nicholas Augustine
(74) *Attorney, Agent, or Firm* — Fish & Richardson P.C.

(57) ABSTRACT

Implementations for determining deployment need for a point of interest (POI) are disclosed. In one implementation, the deployment need for a POI is determined by: receiving geographical locations of one or more users, determining, based on the geographical locations, one or more target users covered by an area to be inspected, determining one or more POI deployment need indexes of the one or more target users, a POI deployment need index of a target user being determined based on a number of POIs that have the preset function of the POI and were deployed within a set distance from the target user, and providing a total deployment need index for the area to be inspected, the total deployment need
(Continued)

index being determined based on the one or more POI deployment need indexes.

20 Claims, 4 Drawing Sheets

(51) Int. Cl.
    *G06F 16/29* (2019.01)
    *G06F 16/951* (2019.01)
    *G06Q 10/06* (2012.01)
    *G06F 16/9537* (2019.01)
    *H04L 29/08* (2006.01)
    *H04W 4/021* (2018.01)
    *G06F 3/00* (2006.01)
    *G06Q 50/26* (2012.01)

(52) U.S. Cl.
    CPC ......... *G06F 16/9537* (2019.01); *G06Q 10/06* (2013.01); *G06Q 10/0637* (2013.01); *H04L 67/18* (2013.01); *H04W 4/021* (2013.01); *G06Q 50/26* (2013.01); *H04L 67/10* (2013.01)

(58) Field of Classification Search
    CPC ......... G06Q 50/26; H04L 67/10; H04L 67/18; H04W 4/021
    See application file for complete search history.

(56) References Cited

U.S. PATENT DOCUMENTS

| | | | | |
|---|---|---|---|---|
| 2010/0076968 | A1* | 3/2010 | Boyns | H04L 67/22 707/732 |
| 2011/0113040 | A1 | 5/2011 | Bickel et al. | |
| 2011/0145228 | A1* | 6/2011 | Laurenzo | G01C 21/20 707/723 |
| 2011/0151898 | A1* | 6/2011 | Chandra | H04W 4/025 455/466 |
| 2011/0208852 | A1* | 8/2011 | Looney | G06Q 20/10 709/223 |
| 2013/0073988 | A1* | 3/2013 | Groten | G01C 21/3679 715/753 |
| 2014/0058841 | A1* | 2/2014 | Getchius | G06Q 30/02 705/14.58 |
| 2014/0094194 | A1 | 4/2014 | Schwent et al. | |
| 2014/0282007 | A1* | 9/2014 | Fleizach | G06F 3/0487 715/728 |
| 2014/0337546 | A1* | 11/2014 | Kitahama | G06Q 50/30 710/73 |
| 2015/0026190 | A1* | 1/2015 | Black | G06F 16/29 707/743 |
| 2015/0074214 | A1 | 3/2015 | Petersen et al. | |
| 2015/0362988 | A1* | 12/2015 | Yamamoto | G06F 3/0487 345/156 |

FOREIGN PATENT DOCUMENTS

| | | |
|---|---|---|
| CN | 102663556 | 9/2012 |
| CN | 103092879 | 5/2013 |
| CN | 103279539 | 9/2013 |
| CN | 103530288 | 1/2014 |
| CN | 103914536 | 7/2014 |
| CN | 104008666 | 8/2014 |
| CN | 104239453 | 12/2014 |
| CN | 104394535 | 3/2015 |
| CN | 104850649 | 8/2015 |
| JP | H08110916 | 4/1996 |
| JP | 2001155049 | 6/2001 |
| JP | 2002358398 | 12/2002 |
| JP | 2004220072 | 8/2004 |
| KR | 20120019775 | 3/2012 |
| KR | 20150015259 | 2/2015 |
| WO | 2015038228 | 3/2015 |

OTHER PUBLICATIONS

Written Opinion in Singaporean Application No. 11201801441X, dated Dec. 17, 2018, 6 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report issued by the International Searching Authority in International Application No. PCT/CN2016/096788 dated Nov. 29, 2016; 9 pages.
Merriam-webster.com [online], "Definition of 'Need'," Aug. 1, 2015, retrieved on Oct. 21, 2020, retrieved from URL<https://www.merriam-webster.com/dictionary/need>, 13 pages.
International Preliminary Report on Patentability in International Application No. PCT/CN2016/096788, dated Mar. 6, 2018, 9 pages (with English Translation).
Ye et al., "Exploiting Geographical Influence for Collaborative Point-of-Interest Recommendation," Proceedings of the 34th International ACM SIGIR conference on Research and Development in Information Retrieval, Jul. 2011, pp. 325-334.

* cited by examiner

DETERMINING DEPLOYMENT NEED FOR POINT OF INTEREST

The application is a continuation of PCT Application No. PCT/CN2016/096788, filed on Aug. 25, 2016, which claims priority to Chinese Patent Application No. 201510558108.7 filed on Sep. 2, 2015, and each application is incorporated by reference in its entirety.

BACKGROUND

The issue of determining a location for deploying a point of interest (POI) has been a concern for service providers. Traditionally, deployment need for a POI over a geographical location is determined based on assumptions on the needs for the POI over the geographical area. For example, deployment need for a POI is considered to be greater in an areas in which service providers have not yet deployed or have deployed only a few number of POIs (that provides a target function). Similarly, new rural-urban continuums formed along with the expansion of urban areas, newly developed industrial parks and development zones or industrial parks and development zones that are gradually reaching a large scale, and areas into which a large number of people flow may be assumed to have a greater need for deploying one or more POIs. These assumptions usually suffer from cognitive one-sidedness, which results in POI deployment address selection that can be far from the actual POI need of an area.

SUMMARY

Implementations of the present disclosure include computer-implemented methods for determining deployment needs for one or more points of interest over a geographic area. In some implementations, deployment need for a point of interest (POI) is determined by: receiving one or more geographic locations of one or more users; determining one or more target users covered by an area to be inspected, the one or more target users being determined based on the one or more geographic locations; determining one or more POI deployment need indexes of the one or more target users, the POI having a preset function and a POI deployment need index of a target user being determined based on a number of POIs that have the preset function and were deployed within a set distance from the target user; and, providing a total deployment need index for the area to be inspected, the total deployment need index being determined based on the one or more POI deployment need indexes. Other implementations include corresponding systems, apparatus, and computer programs, configured to perform the actions of the methods, encoded on computer storage devices.

These and other implementations may each optionally include one or more of the following features. For instance, determining the area to be inspected by dividing a target geographic area into a plurality of grid areas of the same size, and providing at least one grid area from the plurality of the grid areas as the area to be inspected; providing, one or more total deployment need indexes of one or more grid areas of the plurality of grid areas to a POI server of a set service provider to determine one or more addresses for deploying to the target geographic area one or more POIs that have the preset function; determining the POI deployment need index of the target user by k1/(N+k2), where k1 and k2 are two positive real numbers and N is the number of POIs that have the preset function and were deployed within the set distance from the target user; setting the total deployment need index as sum of the one or more POI deployment need indexes; determining the one or more target users by filtering out one or more non-target users from a group of users covered by the area to be inspected, a non-target user satisfying at least one condition from a group of conditions consisting of: the non-target user does not need the preset function, and at least one POI that has the preset function has been deployed within the set distance of the non-target user; deploying the at least one POI by a common service provider that interacts with the non-target user more frequently than other service providers that are able to deploy POIs that have the preset function.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, if executed by the one or more computers, perform the computer-implemented method/the computer-readable instructions stored on the non-transitory, computer-readable medium.

The subject matter described in the specification can be implemented in particular implementations, so as to realize one or more of the following advantages. The following advantages reduce the processing time and computational complexities, improve precision in calculating and predicting deployment needs of POIs, and improve accuracy in determining one or more addresses to which the POIs should be deployed. First, deployment need can be determined based on the need for a particular function of a point of interest (POI). Second, the deployment need can be determined for a targeted geographical area. Third, the deployment need for a targeted geographical area can be determined based on the need of the users covered by the targeted area. Fourth, one or more addresses (or geographical locations) for deploying a POI can be determined based on the need in the one or more addresses for a particular function that the POI provides. Fifth, the target geographical location can be divided into grid areas and the deployment need for a POI over each grid area can be determined. Thus, the geographical location for which the POI should be deployed can be zoomed in or zoomed out (for example, a geographical location with a 10 miles radius or with a 1 mile radius).

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes methods and systems for determining deployment need for points of interest in a geographical area, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art can be omitted so as to not obscure one or more described implementations. The present disclosure is not intended to be limited to the described or illustrated implementations, but to be accorded the widest scope consistent with the described principles and features.

A point of interest (POI) in the present disclosure refers to various service services. For example, a POI can be a self-service terminal (for example, an ATM) or a fixed service location (for example, a pharmacy), or a combination of both. A POI can have one or more particular (or set) functions; meaning that the POI can provide the particular functions. For example, an ATM can have a particular function of providing money withdrawal service.

Implementations of the present disclosure are described in further detail herein with reference to at least one example context. The example context includes automatic teller machine (ATM) as a POI. It is contemplated, however, that implementations of the present disclosure can be realized with any appropriate context.

In some implementations, a server can determine target users covered by an area to be inspected (referred to as "inspecting area"). In some examples, the server determines a deployment need index (also referred to as "need index") of one or more of the target users for a POI. In some examples, the need index is determined for each target user. The server can also determine a total deployment need index (also referred to as "total need index") corresponding to the area to be inspected. In some implementations, the server determines the total need index based on the need index of one or more of the target users covered by the area to be inspected. For example, the total need index can be determined based on need index of all of the target users covered by the area. In some examples, the need index, the total need index, or both, care determined for POIs that provide a particular (or preset) function.

Figure 1:
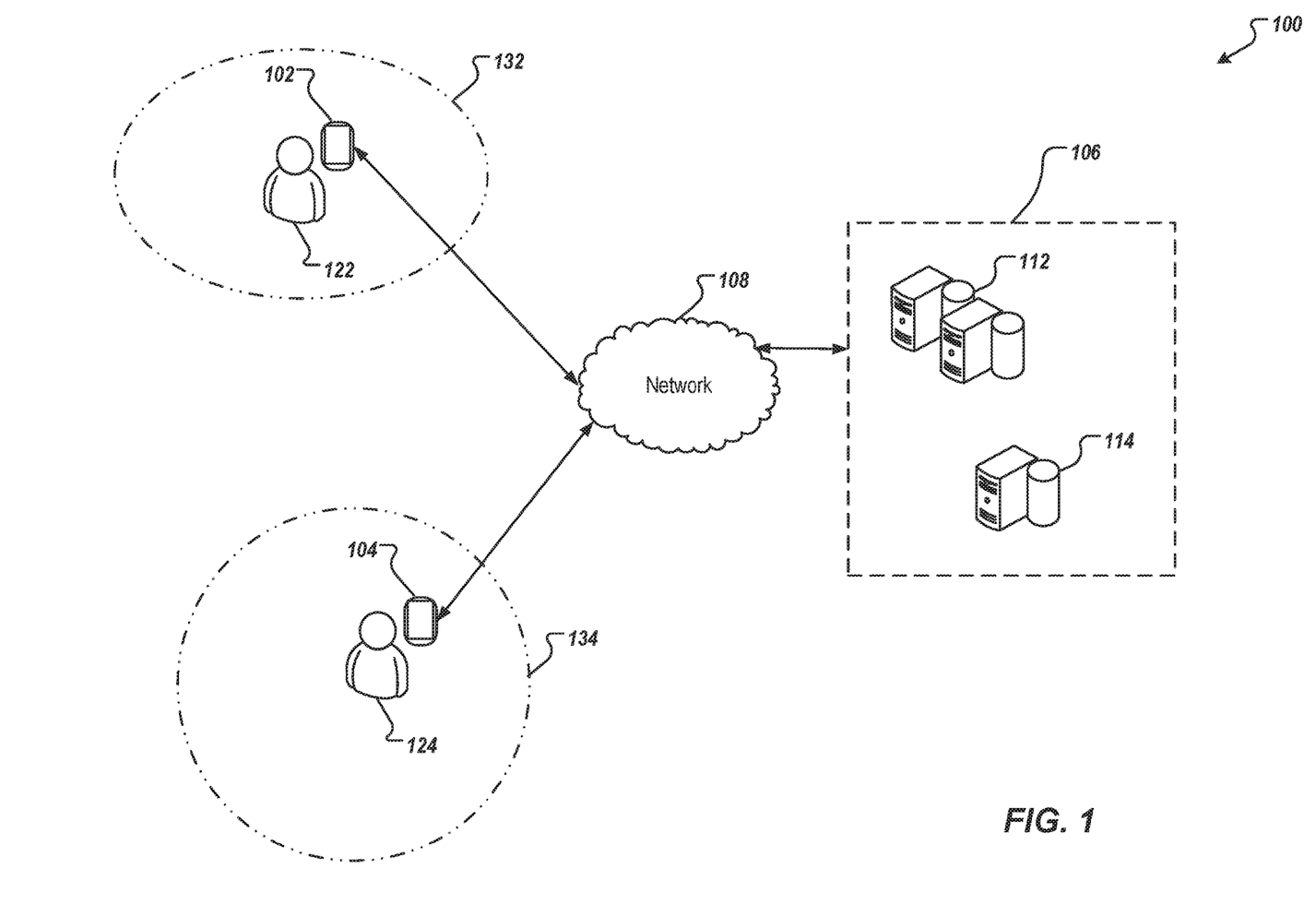
FIG. 1 is an example environment that can be used to execute implementations of the present disclosure.

FIG. 1 depicts an example environment 100 to execute implementations of the present disclosure. The example environment 100 includes one or more User Devices 102, 104, a Server System 106, and a Network 108. The User Devices 102, 104, and the Server System 106 can communicate with each other over the Network 108. The Server System 106 includes one or more Servers 112, 114.

Users 122, 124, can interact with the respective User Devices 102, 104. For example, a user (e.g., 122) can interact with a software application (or "application"), such as a map application, installed on the User Device 102. The application can be hosted by one of the servers of the Server System 106, or by a third-party server in communication with the Server System 106. The User Device 102 can be a wearable device, such as a smart watch, a smart badge, or smart glasses. The User Device 102 can include a plurality of components, as described in detail with reference to FIG. 2. The User Device 102 can enable inputs and information display for the User 122 using a preset standard interface conforming to the application protocol. Each of the Users 122 and 124 can be associated with respective Areas 132 and 134.

Figure 2:
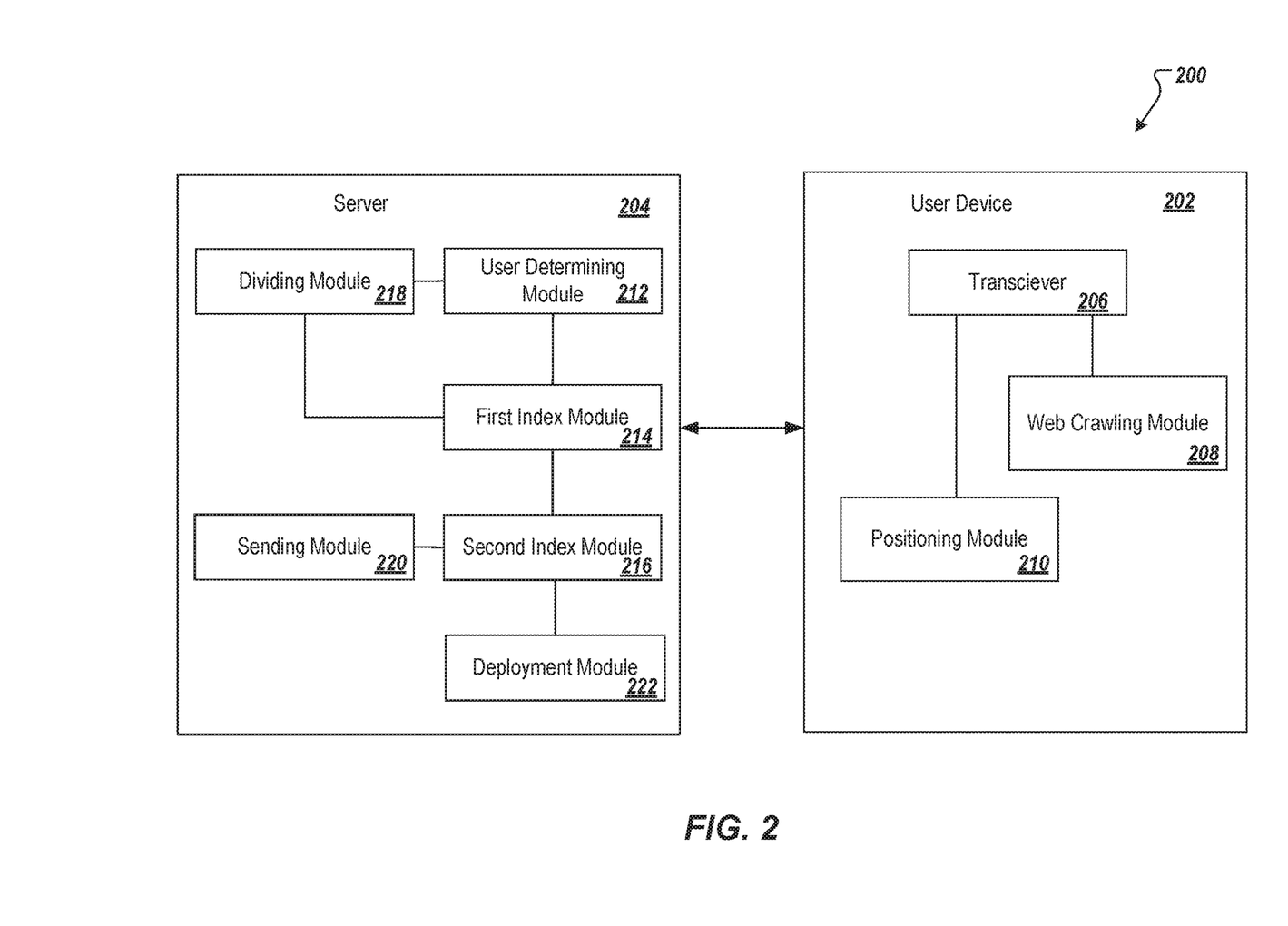
FIG. 2 is a block diagram illustrating an example architecture, according to an implementation of the present disclosure.

FIG. 2 is a block diagram illustrating an example architecture 200 that can be used to execute implementations of the present disclosure. In the depicted example, the example architecture 200 includes a User Device 202 (for example, User Device 102 described with reference to FIG. 1) in communication with a Sever 204 (for example, Server 112 described with reference to FIG. 1). The User Device 202 includes a Transceiver 206, a Web Crawling Module 208, and a Positioning Module 210. The Server 204 includes a User Determining Module 212, a First Index Module 214, a Second Index Module 216, a Dividing Module 218, a Sending Module 220, and a Deployment Module 222.

In some implementations according to the present disclosure, an inspecting area is pre-set in a server. The server can be the one that determines the deployment need for a POI, or may be in communication with another server that determines the deployment need for the POI. For example, Area 132 may be set as an inspecting area in the Server 112. In some implementations, an inspecting area is determined based on current location of one or more users. In some implementations, the system determines an inspecting area based on the frequency that one or more users have stayed within that area. For example, the system can follow the User 122 and determines that the User 122 has stayed within the area covered by 132 more than a threshold value (e.g., two days a month) and set 132 as an inspecting area.

In some implementations, geographical location of a user is extracted from network (e.g., internet or local network in communication with the server) interaction of the user. For example, the Server 112 can determine location of the User 122 based on the services received on the User Device 102, such as web crawling and navigation. For example, the Web Crawling Module 208 can send information on web crawling or network services used by a user of the User Device 202 to the Server 204 through the transceiver 206. In some examples, the Server 112 extracts address information of a user based on one or more addresses (such as addresses for a delivery or for enrolling into an application) that the user has entered into the user device.

In some examples, a server extracts a user address from the period or number of times the user has spent in a location (or within an area). For example, the Positioning Module 210 determines the location of the User Device 202 (for example, by a Global Positioning System (GPS)) and sends the location to the Server 204 through the Transceiver 220. In some examples, the server associates one or more time sets with one or more addresses of the user. For example, the server can associate day time or weekdays to a work address, and night time or weekends to a home address of a user. Thus, a user may be associated with more than one address; and two or more inspecting areas may cover the same user.

In some implementations, the Server 204 uses the geographical location received from the User Device 202 to determine whether the User Device 202 is within an inspecting area. In some examples, the inspecting area is a targeting (or set) geographic area that needs to be inspected for need to deploy one or more POIs. In some implementations, the Server 204 uses the geographic location of the User Device

202 and sets the inspecting area as an area around the User Device 202's location. For example, the server 204 determines the inspecting area to be an area within 50 miles of a geographic location associated with the User Device 202.

In some implementations, the server determines target users. For example, server 204 determines the target users by User Determining Module 212. In some implementations, all of the users covered by an inspecting area are considered target users. In some implementations, target users are selected from the users covered by an inspecting area. In some examples, target users are selected based on the needs of the users. In some examples, target users are determined on POI basis. For instance, a user may be a non-target user for a POI and a target user for another POI. As another example, a user may be considered non-target for a POI if the user has no need for the particular function of the POI.

In some implementations, non-target users are determined and the remaining users covered by an inspecting area are considered target users. For example, a user can be considered as a non-target user for a POI if the user satisfies one or more of the following conditions:

(1) There is no need to use (or deploy) the POI for the user. For example, a user may not need a particular function of POIs. For instance, in the ATM example, a user who has no deposit or credit card does not need an ATM (which has the particular function of a self-service money withdrawal). Alternatively, a user may be considered a target or a non-target user depending on a level of need for a POI. For example, a number of debit card holders and credit card holders can be compared and in case that the ratio of the two numbers is greater than a threshold value (for example, five thousands), credit card holders can be considered as target users for ATM POI.

(2) A POI that provides the particular function has already been deployed by a set service provider (or set-service-provider) or by a common service provider (or common-service-provider), or both, within a set distance from the user. For example, if an ATM as the POI has been deployed within a 5 miles vicinity of the user, the user can be considered as a non-target user for the ATM POI. The set distance can be pre-set in the server or can be set by a service provider. In some instances, the distance is set based on the POI that is being targeted (to be deployed). For example, for an ATM POI, the distance may be defined as 5 miles, while for a Gas Station POI, the distance may be set as 2 miles.

In some cases, a set service provider is a service provider that is set to deploy the POI. In some examples, a set service provider has one or more servers and at least one of the servers can deploy the POI (referred to as "POI server"). In some examples, a deployment need index of a POI is specific to one or more certain set service providers. In some examples, a set service provider can be associated with more than one POIs. For example, a Banking service provider may provide ATM and Bank Branch as two POIs. In some instances, if at least one of the service providers deploys a POI within the set of distance of a user, the user can be considered as a non-target user for the POI. In some cases, a set service provider is set to deploy one or more POIs and at least one of the one or more POIs provides the particular function (that is needed to be deployed).

In some cases, a common service provider is a service provider that interacts with the user more frequently than other service providers that offer POIs that provide the particular function. The common service provider can be a set service provider for a particular POI, or can be a service provider that is not set as a provider of the particular POI, but still is able to offer the services (for example, the particular functions) that the POI provides. For example, a Grocery service provider that is not set as a set service provider for ATM POI may have already deployed a Super Market POI that offers money withdrawals (which is a particular function of ATM). In this example, assuming that the Grocery service provider interacts with the user more frequently than other service providers that provide POIs with the particular function of money withdrawal, the Grocery service provider can be considered as a common service provider for the user.

In some implementations, one or more deployment need indexes (i.e., need indexes) for the POIs are determined for one or more target users. For example, the deployment need indexes can be determined by the First Index Module 214 of the Server 204. The First Index Module 214 can determine the deployment need indexes for the target users that were determined by the User Determining Module 212. In some examples, a deployment need index for a POI having a particular function is determined for each target user.

The deployment need index of a target user for a POI that provides a particular function can be determined based on a number of POIs deployed within a set distance of the target user. In some examples, the number of POIs is determined for the deployed POIs that provide the particular function. In some examples, the fewer the number of deployed POIs is, the greater the deployment need index of the target user is for the POI. In some examples, the deployment need index for a POI is inversely proportional to the number of deployed POIs. For example, the deployment need index of a target user for a POI can be determined by $k1/(N+k2)$, where N is the number of POIs deployed within the set distance from the target user; and k1 and k2 are real numbers. For instance, in an example with $k1=1$ and $k2=0$, if three ATMs (POIs) are deployed within a set distance of a target user, the target user's deployment need index is ⅓. In some examples, the deployment need index of a target user for a POI can be determined by $k1/(N+k2)^n$, where n is a real number.

In some implementations, a total deployment need index (or total need index) is determined for the inspecting area. For example, the total deployment index can be determined by the Second Index Module 216 of the Server 204. The total deployment need index can be determined based on the deployment need indexes of the target users covered by the inspecting area. For instance, the Second Index Module 216 may determine the total deployment index based on deployment need indexes received from the First Index Module 214 for. For example, a total deployment need index of a POI for the inspecting area can be determined based on deployment need index (for the POI) of each of the target users covered by the inspecting area.

In some implementations, the total deployment index is a sum of the deployment need indexes of the target users covered by the inspecting area. For example, if A and B are two users in an inspecting area and there are three ATMs (POI) within a set distance (e.g., 2 miles) of user A and one ATM within the set distance of user B, the total deployment need index of the inspecting area can be 4/3.

In some implementations, one or more deployment need indexes for a POI are corresponding to a weight. For example, each user (for whom the deployment need index is determined) may be corresponding to a weight. For instance, a household of a family of five may be corresponding to a greater weight than a single person user does. In some examples, each of the deployment need indexes are multiplied by their respective weight and the total deployment need index is determined by adding up the production of the deployment need index and their respective weights.

In some implementations, the inspecting area is a portion of a target geographic area in which POIs are to be deployed. In some examples, the target geographic area is divided into one or more grid areas. For example, the Server 204 can target a geographic area and the Dividing Module 218 can divide the target area into a plurality of grid areas to be inspected. Two grid areas can have the same size or different sizes. In some instances, the target geographic area is divided into gird areas of equal size.

In some instances, each grid area is considered as an area to be inspected (an inspecting area) and target users are determined for the respective grid area (in other words, target users that are covered by the respective grid area are determined). For example, the User Determining Module 212 can determine target users for one or more of the target areas determined by the Dividing Module 218 of the Server 204.

In some examples, one or more addresses (e.g., the grid area) for deploying the POI is provided based on the total deployment need index for one or more of the grid areas. For example, POI may be deployed to a grid area that has a greater total deployment need index than grid areas adjacent to the grid area.

In some implementations, a map representing a target geographic area is rendered based on the total deployment need index associated with each grid area of the geographic area. For example, a grid area having a lower total deployment need index can be presented on the map with a lighter color or in a more transparent form, or both, than a grid area having a greater total deployment need index. In some examples, the rendered map is sent to a set service provider, and the set service provider selects a deployment address for a POI according to the deployment need of each grid area (for example, based on information displayed on the map).

In some implementations, the server determines a deployment address, or deploys the needed POI, or both, based on the total deployment need index. For example, the Deployment Module 222 of the Server 204 deploys a POI based on the total deployment need index provided by the Second Index Module 216.

In some implementations, the server (e.g., Server 204) send a POI deployment request to one or more service providers. In some examples, the server sends the request to all service providers with which the server is in communication. In some examples, one or more of the service providers are set service providers that are set to deploy particular POIs (e.g., through POI servers in a set service provider). For example, the server may send a POI deployment request only to service providers that provide at least one POI with a particular function. In some examples, the server sends the POI deployment request to one or more POI servers of the set service providers.

For example, Server 204 can be in communication with a group of service providers and Sending Module 220 can send the total deployment need index (that is provided by the Second Index Module 216) for a POI to one or more service providers that provide the POI. In an example, the Sending Module 220 can send the total deployment need indexes after the Second Index Module 216 determines the respective total deployment indexes for all of the grid areas.

In some implementations, a service provider (or a POI server) determines addresses or areas for deploying the requested POIs. For example, a service provider can determine the address based on one or more total deployment need index corresponding to grid areas. In some implementations, the server (e.g., Server 204) determines the deployment address (or area) and sends the address to a service provider set for deploying the POI (or to a POI server of a service provider). Consequently, the service provider can deploy the requested POI to the address.

Figure 3A:
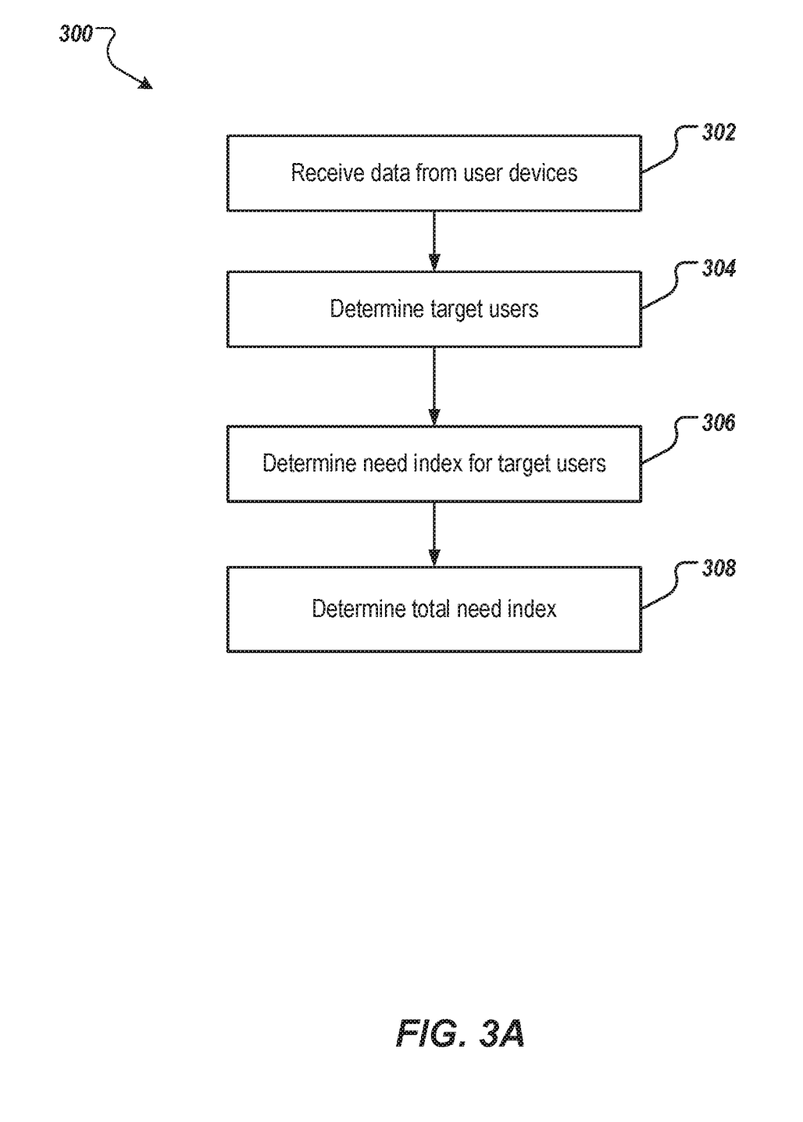
FIGS. 3A-3B are flowcharts illustrating example methods for performing a service operation, according to an implementation of the present disclosure.
Figure 3B:
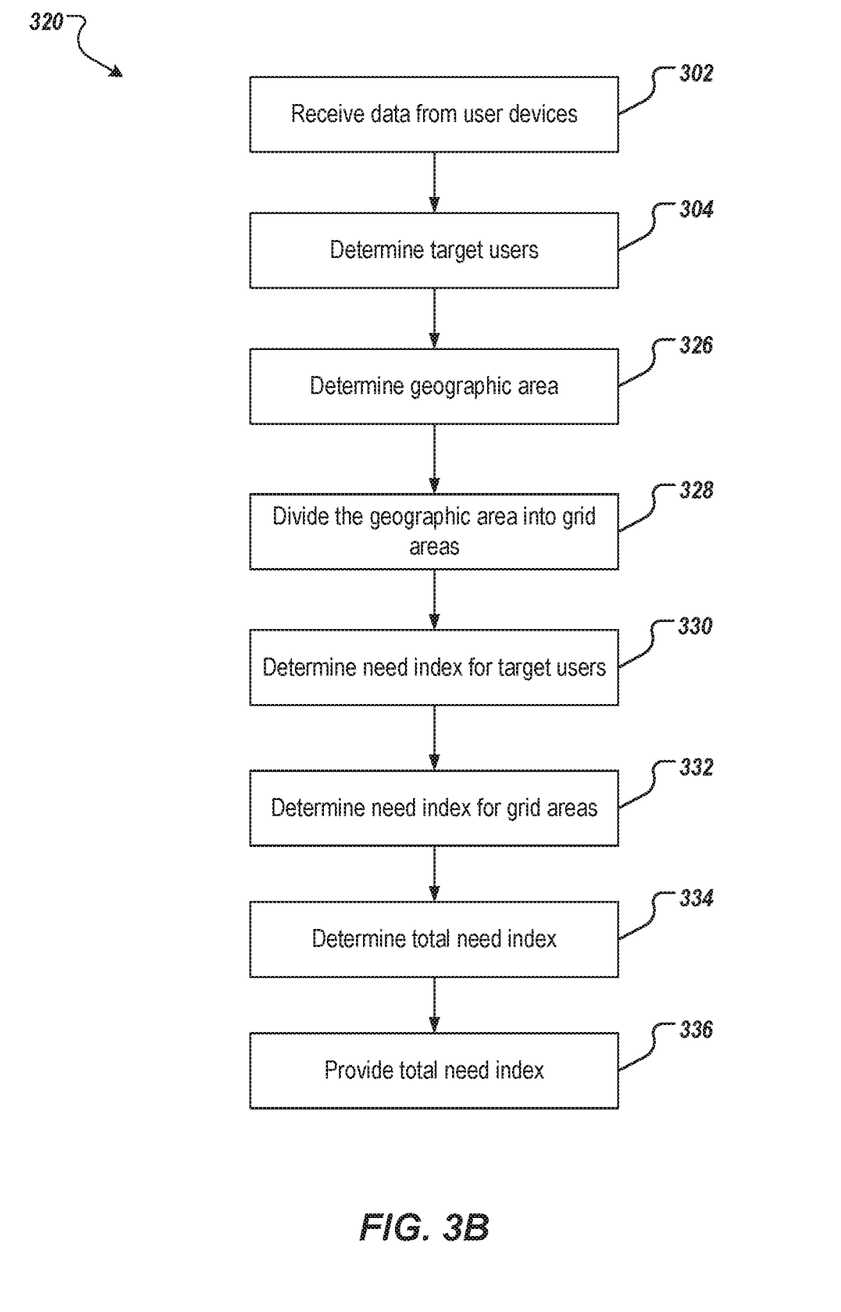

FIGS. 3A and 3B are flowcharts illustrating examples of methods 300 and 320, respectively, according to two implementations of the present disclosure. Either of the methods 300 and 320 can be implemented as one or more computer-executable programs executed using one or more computing devices, as described with reference to FIGS. 1, 2 and 4. In some implementations, various steps of either of the example methods 300 and 320 can be run in parallel, in combination, in loops, or in any order.

Referring to FIG. 3A, at 302 data is received from user devices. For example, data can be received at the Server System 106 from the User Device 102. The data can be transmitted by Transceiver 206 from the User Device 204 to the Server 202. The data can, for example, have information regarding geographical location corresponding to the user device.

At 304, target users are determined. For example, target users can be determined by the User Determining Module 212 of the Server 202. In some examples, the target users are determined for an area to be inspected (i.e., inspecting area) for deployment need of a POI, for example, based on the information received from the user devices. The target users can be determined by determining and eliminating non-target users covered in the inspecting area.

At 306, need index (i.e., deployment need index) for target users are determined. For example, the need index can be determined by the First Index Module 214. The need index for a target user can be specific to a POI. In some examples, need indexes are determined for one or more the target users covered in an inspecting area.

At 308, total need index (i.e., total deployment need index) is determined. For example total need index can be determined by the Second Index Module 216. Total need index can be determined for an inspecting area and based on the need indexes of the target users covered by the inspecting area.

Referring to FIG. 3B, at 326, geographic area is determined. In some examples, a geographic area is a targeted area pre-set in the Server 204. In some examples, a geographic area is determined based on one or more target users and the geographic location of these one or more target users. For example, based on the information received from the User Device 202, the Server 204 can consider an area within a 50 miles distance of a geographic location corresponding to the User Device 202 as the geographic area.

At 328, the geographic area is divided into grid areas. For example, the Dividing Module 218 can divide the geographic area into one or more grid areas. In some examples, the grid areas have the same size.

At 330, need index for target users are determined. For example, the First Index Module 214 determines need index (i.e., deployment need index) for the target users covered by one or more grid areas provided by the Dividing Module 218. In some examples, a need index for a target users is specific to one or more POIs.

At 334, total need index is determined. For example, the Second Index Module 216 determines the total need index (i.e., total deployment need index) for one or more grid areas based on the need indexes provided by the First Index Module 214. In some examples, a total need index is specific to a grid area and is based on the need index of the target users covered by the grid area. In some examples, the total need index is based on the need indexes of target users covered by two or more grid areas. Total need index can be specific to one or more POIs.

At 336, total need index is provided. In some examples, the total need index is sent to a service providing module (not shown) of the Server 204. In some examples, the total need index is sent to one or more servers of a set service provider. For instance, the Sending module 220 can send the total need index of a POI to a server (or a service provider) associated with the POI (i.e., POI server). The POI server can deploy the POI to one or more addresses based on the provided total need indexes. For example, the POI server can deploy the POI to a grid area that has the greatest total need index among the grid areas of the target geographic area.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same.

Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for determining deployment need for a point of interest (POI), the computer-implemented method comprising:
    receiving, by one or more processors, user data comprising a plurality of geographic locations of one or more users;
    determining, by the one or more processors, one or more target user devices covered by an area to be inspected, the one or more target user devices being determined based on the plurality of geographic locations;
    determining, by the one or more processors, a potential usage of a preset function of the POI relative to a total number of deployed POIs within a set distance from a target user device;
    determining, by the one or more processors, one or more POI deployment need indexes of the one or more target user devices, by comparing the potential usage of the preset function to a threshold defining a number of user devices of the preset function within the set distance from the target user device;
    providing, by the one or more processors, a total deployment need index for the area to be inspected, the total deployment need index being determined based on the one or more POI deployment need indexes;
    generating, by the one or more processors, a map comprising the total deployment need index for the area to be inspected and the one or more POI deployment need indexes for a remaining portion of the plurality of geographic locations; and
    displaying the map using highlights to differentiate the total deployment need index for the area to be inspected from the one or more POI deployment need indexes.

2. The computer-implemented method of claim 1, wherein the area to be inspected is determined by:
    dividing, by the one or more processors, a target geographic area into a plurality of grid areas of the same size, and
    providing, by the one or more processors, at least one grid area from the plurality of the grid areas as the area to be inspected.

3. The computer-implemented method of claim 2, further comprising providing, by the one or more processors, one or more total deployment need indexes of one or more grid areas of the plurality of grid areas to a POI server of a set service provider to determine one or more addresses for deploying to the target geographic area one or more POIs that have the preset function.

4. The computer-implemented method of claim 1, wherein the POI deployment need index of the target user is determined by $k_1/(N+k_2)$, where $k_1$ and $k_2$ are two positive real numbers and $N$ is the number of POIs that have the preset function and were deployed within the set distance from the target user.

5. The computer-implemented method of claim 1, wherein the total deployment need index is sum of the one or more POI deployment need indexes.

6. The computer-implemented method of claim 1, wherein the one or more target users are determined by filtering out one or more non-target users from a group of users covered by the area to be inspected, wherein a non-target user satisfies at least one condition from a group of conditions consisting of:
    the non-target user does not need the preset function, and
    at least one POI that has the preset function has been deployed within the set distance of the non-target user.

7. The computer-implemented method of claim 6, wherein the at least one POI has been deployed by a common service provider that interacts with the non-target user more frequently than other service providers that are able to deploy POIs that have the preset function.

8. A non-transitory, computer-readable medium storing one or more instructions executable by a computer system to perform operations for determining deployment need for a point of interest (POI), the operations comprising:
    receiving user data comprising a plurality of geographic locations of one or more users;
    determining one or more target user devices covered by an area to be inspected, the one or more target user devices being determined based on the plurality of geographic locations;
    determining a potential usage of a preset function of the POI relative to a total number of deployed POIs within a set distance from a target user device;
    determining one or more POI deployment need indexes of the one or more target user devices, by comparing the potential usage of the preset function to a threshold defining a number of user devices of the preset function within the set distance from the target user device;
    providing a total deployment need index for the area to be inspected, the total deployment need index being determined based on the one or more POI deployment need indexes;
    generating a map comprising the total deployment need index for the area to be inspected and the one or more POI deployment need indexes for a remaining portion of the plurality of geographic locations; and
    displaying the map using highlights to differentiate the total deployment need index for the area to be inspected from the one or more POI deployment need indexes.

9. The non-transitory, computer-readable medium of claim 8, wherein the area to be inspected is determined by one or more instructions to perform:
dividing a target geographic area into a plurality of grid areas of the same size, and
providing at least one grid area from the plurality of the grid areas as the area to be inspected.

10. The non-transitory, computer-readable medium of claim 9, further comprising one or more instructions to perform providing one or more total deployment need indexes of one or more grid areas of the plurality of grid areas to a POI server of a set service provider to determine one or more addresses for deploying to the target geographic area one or more POIs that have the preset function.

11. The non-transitory, computer-readable medium of claim 8, wherein the POI deployment need index of the target user is determined by k1/(N+k2), where k1 and k2 are two positive real numbers and N is the number of POIs that have the preset function and were deployed within the set distance from the target user.

12. The non-transitory, computer-readable medium of claim 8, wherein the total deployment need index is sum of the one or more POI deployment need indexes.

13. The non-transitory, computer-readable medium of claim 8, wherein the one or more target users are determined by filtering out one or more non-target users from a group of users covered by the area to be inspected, wherein a non-target user satisfies at least one condition from a group of conditions comprising:
the non-target user does not need the preset function, and
at least one POI that has the preset function has been deployed within the set distance of the non-target user.

14. The non-transitory, computer-readable medium of claim 13, wherein the at least one POI has been deployed by a common service provider that interacts with the non-target user more frequently than other service providers that are able to deploy POIs that have the preset function.

15. A computer-implemented system for determining deployment need for a point of interest (POI), the system comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving user data comprising a plurality of geographic locations of one or more users;
determining one or more target user devices covered by an area to be inspected, the one or more target user devices being determined based on the plurality of geographic locations;
determining a potential usage of a preset function of the POI relative to a total number of deployed POIs within a set distance from a target user device;
determining one or more POI deployment need indexes of the one or more target user devices, by comparing the potential usage of the preset function to a threshold defining a number of user devices of the preset function within the set distance from the target user device;
providing a total deployment need index for the area to be inspected, the total deployment need index being determined based on the one or more POI deployment need indexes;
generating a map comprising the total deployment need index for the area to be inspected and the one or more POI deployment need indexes for a remaining portion of the plurality of geographic locations; and
displaying the map using highlights to differentiate the total deployment need index for the area to be inspected from the one or more POI deployment need indexes.

16. The computer-implemented system of claim 15, wherein the system is configured to determine the area to be inspected is determined by:
dividing a target geographic area into a plurality of grid areas of the same size, and
providing at least one grid area from the plurality of the grid areas as the area to be inspected.

17. The computer-implemented system of claim 16, further configured to provide one or more total deployment need indexes of one or more grid areas of the plurality of grid areas to a POI server of a set service provider to determine one or more addresses for deploying to the target geographic area one or more POIs that have the preset function.

18. The computer-implemented system of claim 15, wherein the POI deployment need index of the target user is determined by k1/(N+k2), where k1 and k2 are two positive real numbers and N is the number of POIs that have the preset function and were deployed within the set distance from the target user.

19. The computer-implemented system of claim 15, wherein the total deployment need index is sum of the one or more POI deployment need indexes.

20. The computer-implemented system of claim 15, wherein the one or more target users are determined by filtering out one or more non-target users from a group of users covered by the area to be inspected, wherein a non-target user satisfies at least one condition from a group of conditions comprising:
the non-target user does not need the preset function, and
at least one POI that has the preset function has been deployed within the set distance of the non-target user.

* * * * *

UNITED STATES PATENT AND TRADEMARK OFFICE
CERTIFICATE OF CORRECTION

PATENT NO. : 11,244,237 B2
APPLICATION NO. : 15/909640
DATED : February 8, 2022
INVENTOR(S) : Hanrui Zhang et al.

Page 1 of 1

It is certified that error appears in the above-identified patent and that said Letters Patent is hereby corrected as shown below:

In the Specification

Column 1, Line 3, below "INTEREST" insert -- CROSS-REFERENCE TO RELATED APPLICATIONS --.

Signed and Sealed this
Twenty-eighth Day of June, 2022

Katherine Kelly Vidal
*Director of the United States Patent and Trademark Office*